April 19, 1938.  K. P. WILLIS  2,114,436

LAWN MOWER

Filed Feb. 27, 1937  3 Sheets-Sheet 1

Inventor
Kirk P. Willis

By
Edward V. Hardway
Attorney

April 19, 1938. K. P. WILLIS 2,114,436
LAWN MOWER
Filed Feb. 27, 1937 3 Sheets-Sheet 2

Inventor
Kirk P. Willis

By Edward V. Hardway
Attorney

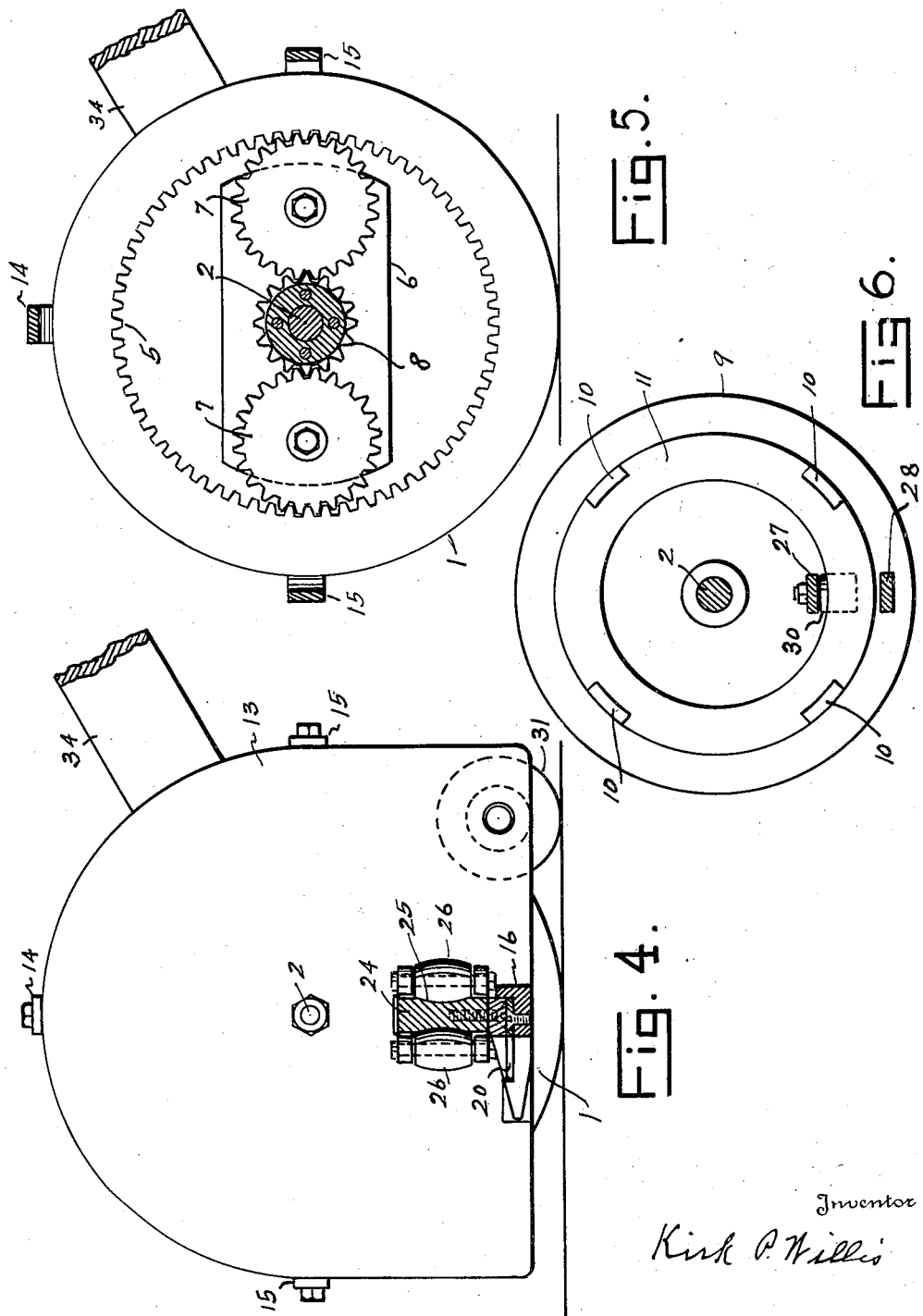

Patented Apr. 19, 1938

2,114,436

UNITED STATES PATENT OFFICE 2,114,436

LAWN MOWER

Kirk P. Willis, Crosby, Tex., assignor of one-fourth to Herman Dunks, Harris County, Tex.

Application February 27, 1937, Serial No. 128,115

5 Claims. (Cl. 56—270)

This invention relates to a lawn mower.

An object of the invention is to provide a mower of the character described having a driving mechanism and a cutter bar and cutter extended laterally from the driving mechanism whereby the grass may be cut close to sidewalks, walls or shrubbery and whereby tall grass may be cut equally as well as if the grass were short.

It is another object of the invention to provide a lawn mower of such construction that the driving ground wheel may be made to travel only over the cut portion of the lawn so that the uncut grass will not be bent down prior to being cut and whereby wheel tracks will not be left on the mowed lawn.

It is another object of the invention to provide a lawn mower that will be very easily operated and can be readily sharpened and wherein the parts most subject to wear can be readily replaced.

It is a further object of the invention to provide, in a lawn mower, a stationary cutter bar and a reciprocating cutter blade or sickle arranged to cooperate therewith with novel means for driving the sickle.

With the above and other objects in view the invention has particular relation to certain novel figures of construction, operation and arrangement of parts, an example of which is given in this specification and illustrated in the accompanying drawings, wherein:—

Figure 4 shows a cross-sectional view taken on the line 4—4 of Figure 1.

Figure 5 shows a cross-sectional view taken on the line 5—5 of Figure 1, and

Figure 6 shows a cross-sectional view taken on the line 6—6 of Figure 1.

Figure 1:
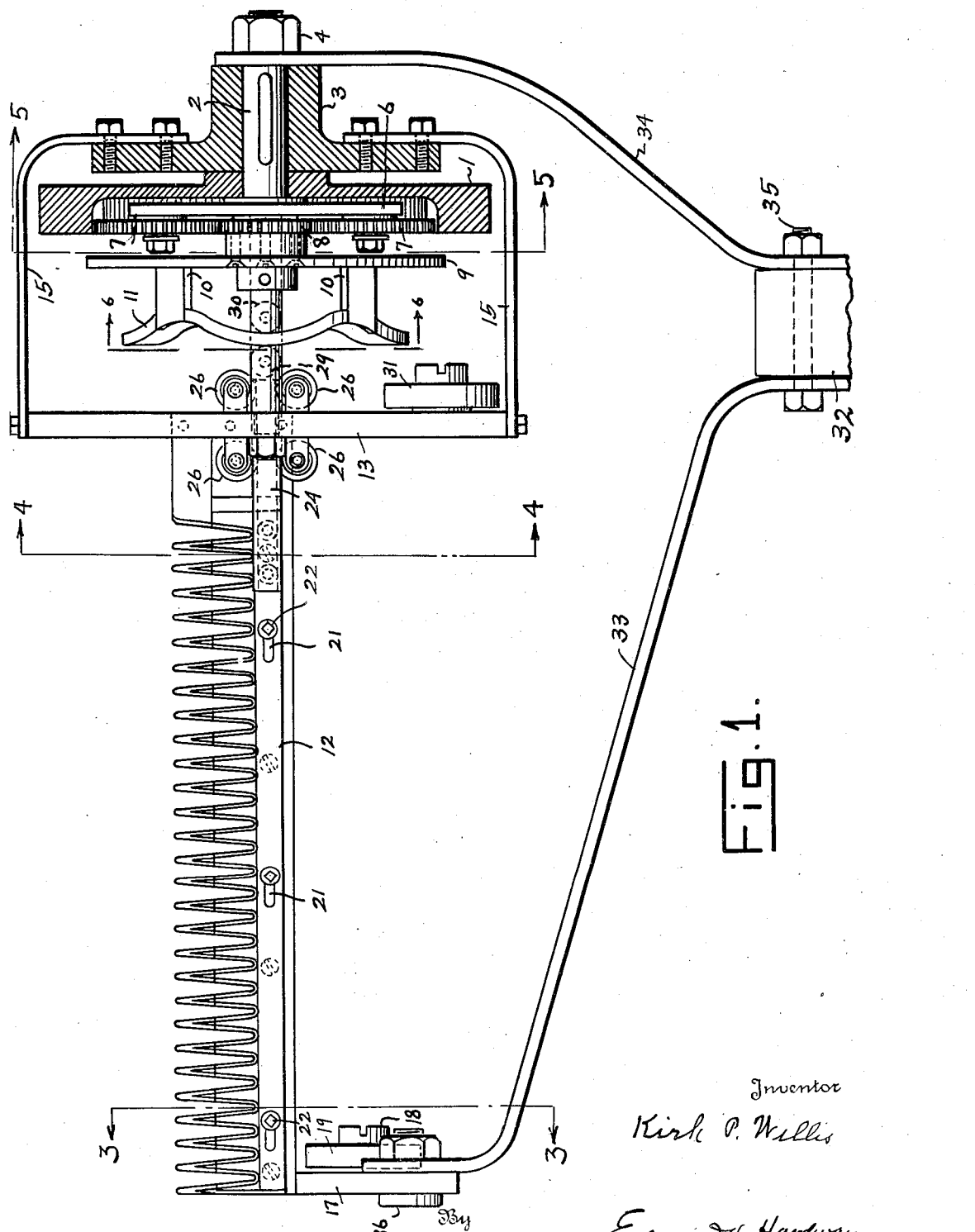
Figure 1 shows a plan view of the machine, partly in section.

Referring now more particularly to the drawings wherein like numerals of reference designate similar parts in each of the figures, the numeral 1 designates the main ground wheel which is loosely mounted on the axle 2. The outer end of the hub of this ground wheel abuts the inner side of the outer end plate 3 through the hub of which the axle 2 extends, said end plate being keyed to the axle. The outer end of the axle is threaded to receive the retaining nut 4. The inner side of the ground wheel 1 is provided with the internal, annular rack face 5. Fixed on the axle 2 there is a yoke 6 and rotatably mounted on spindles on opposite ends of this yoke are the spur gears 7, 7 which are in mesh with the rack face and which are also in mesh with an intermediate spur gear 8. Fastened to the gear 8 there is the disc 9 which has forwardly projecting brackets 10 to the free ends of which the cam shaped ring 11 is fixed. This ring is of a form to impart a uniform reciprocating movement to the cutter blade 12 as will be more specifically hereinafter explained. The inner end of the axle 2 is attached to and supports the inner end plate 13, said outer and inner end plates 3 and 13 being secured together by means of the arched top bracket 14 and the side brackets 15, 15 which are suitably secured thereto.

Fastened to the inner end plate 13 and extending laterally therefrom the required distance there is the cutter bar 16.

Fixed to the outer end of the cutter bar at its rear side, and upstanding therefrom, there is the guard plate 17. This guard plate has an inwardly extending spindle 18 on which the ground roller 19 is mounted. The cutter blade 12 extends approximately the full length of the cutter bar and is seated to reciprocate on a wear plate 20 which is formed of hard material and which is detachable for replacement in case of wear. The forward margins of the cutter bar, wear plate and cutter blade, or sickle, are serrated and as the sickle reciprocates the cooperating margins of the teeth of the sickle and wear plate act with shear like effect, in the well known manner to shear off the grass between the teeth thus formed.

The sickle or cutter blade 12 has the longitudinal slots 21 and bolts 22 are fitted through said slots and are screwed into the cutter bar 16 beneath. Coiled springs 23 surround said bolts and are interposed between the bolt heads above and the sickle beneath whereby said sickle is held yieldingly but firmly against the wear plate 20.

Figure 2:
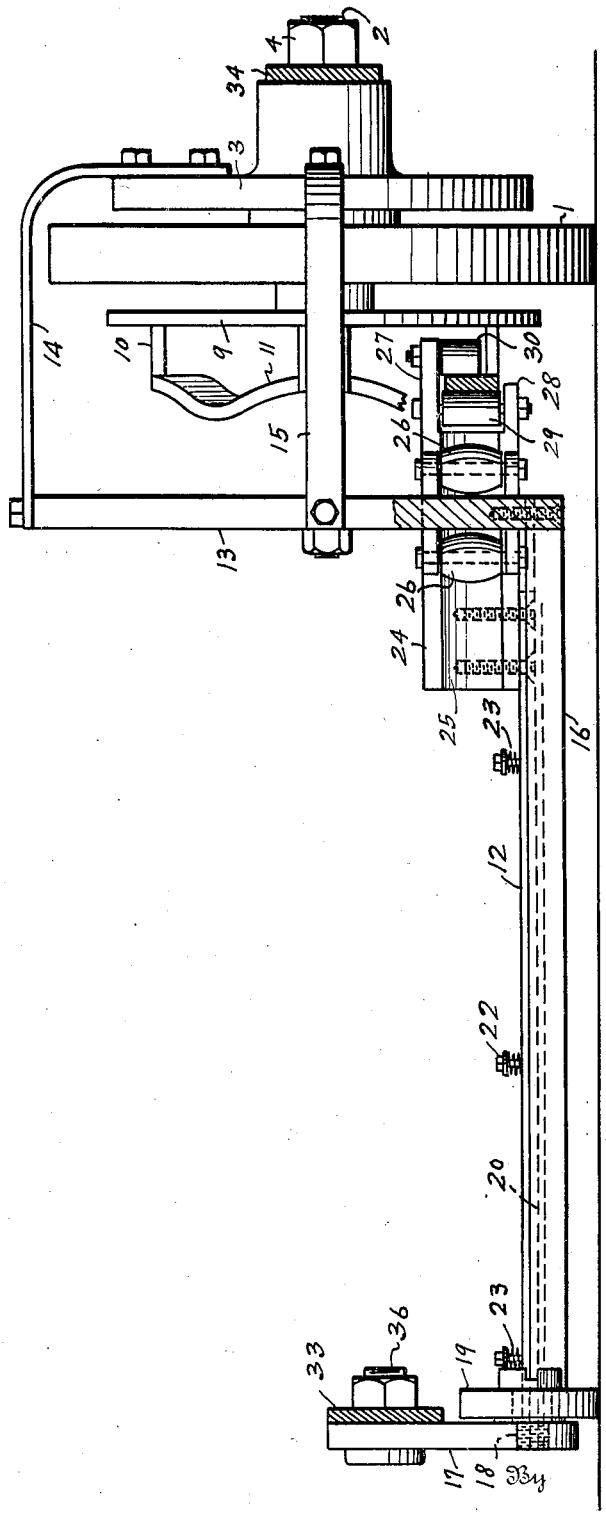
Figure 2 shows a rear elevation, partly in section.
Figure 3:
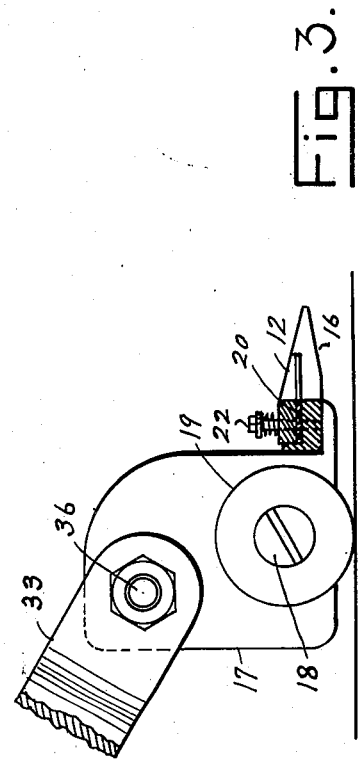
Figure 3 shows a cross-sectional view taken on the line 3—3 of Figure 1.

Attached to the inner end of the cutter blade 12 there is the head 24 whose sides have the longitudinal shallow concave grooves as 25. This head works through an aligned slot in the inner end plate 13 and said end plate carries the oppositely arranged convex side rollers 26, 26 which ride in the grooves 25 thus providing antifriction means for mounting the head 24. The inner end of this head has the upper and lower fingers 27, 28. Between these fingers there is mounted the roller 29 which rides against one face of the ring 11. The finger 27 is extended and carries the roller 30 which rides against the opposite face of the ring 11 as shown in Figure 2 whereby upon rotation of the cam shaped ring 11 the sickle will be reciprocated.

The inner end plate 13 may also be provided with a supporting roller 31, similar to the roller 19.

The lawn mower is equipped with the usual handle, or push bar 32 and this handle is attached to the mower by means of the straps 33, 34 which are bolted, at one end, to the handle by bolts as 35. The other end of the strap 33 is secured to the guard plate by the bolt 36. The forward end of the strap 34 has an opening through which the outer end of the axle 2 extends and it is clamped in place by means of the nut 4.

The drawings and description disclose what is now considered to be a preferred form of the invention by way of illustration only, while the broad principle of the invention will be defined by the appended claims.

What I claim is:—

1. A lawn mower comprising an axle, a frame on the axle comprising outer and inner end plates and brackets connecting said plates, a main ground wheel rotatably mounted on the axle, a cam shaped ring, gearing connecting the ground wheel to the ring for rotating the latter, a laterally extended cutter bar anchored to the inner end plate, a sickle arranged to cooperate with the cutter bar, rollers carried by the inner end of the sickle and working on opposite sides of the cam shaped ring whereby upon rotation of the ring the sickle will be reciprocated.

2. A lawn mower comprising a frame, an axle on which the frame is mounted, a ground wheel rotatably mounted on the axle, a cutter bar extended laterally from the frame, a sickle arranged to cooperate with the cutter bar, a head attached to the sickle, antifriction rollers on the frame between which the head works, antifriction bearings on the head, a cam ring working between said bearings, means operatively connected with the ground wheel for rotating said ring to reciprocate the sickle.

3. A lawn mower comprising a frame, an axle on which the frame is mounted, a ground wheel rotatably mounted on the axle, a cutter bar extended laterally from the frame, a sickle arranged to cooperate with the cutter bar, a head attached to the sickle, antifriction rollers on the frame between which the head works, antifriction bearings on the head, a cam ring working between said bearings, means operatively connected with the ground wheel for rotating said ring to reciprocate the sickle, ground rollers, one carried by the frame and one mounted at the outer end of the cutter bar.

4. A lawn mower comprising a frame, an axle on which the frame is mounted, a ground wheel rotatably mounted on the axle, a cutter bar extended laterally from the frame, a sickle arranged to cooperate with the cutter bar, a head attached to the sickle, antifriction rollers on the frame between which the head works, antifriction bearing means on the head, a cam ring having opposing cam faces which work in contact with said anti-friction bearing means, gears operatively connected with the ground wheel for rotating said ring to reciprocate the sickle, ground rollers, one carried by the frame and one mounted at the outer end of the cutter bar.

5. A lawn mower having a frame, outer and inner end plates on said frame, a hub on the outer end plate, an axle extending through the hub, a ground wheel mounted on said axle, gears within said ground wheel, a disc connected to said gears and adapted to be driven thereby, a cam ring mounted on said disc, a cutter bar extending outwardly from said inner plate, a yieldingly mounted sickle on said cutter bar, a head attached to the sickle, antifriction rollers on the frame between which said head works, antifriction bearings on the head, said cam ring working between said bearings, ground rollers mounted one on the outer end of the cutter bar and one on the frame, a handle bracket, one end of said bracket being mounted on the axle adjacent the hub of the outer end plate and the other end of said bracket being mounted on the outer end of said cutter bar.

KIRK P. WILLIS.